(12) United States Patent
Like

(10) Patent No.: US 11,942,771 B2
(45) Date of Patent: Mar. 26, 2024

(54) POWER DISTRIBUTION BOX WITH AN ENGAGEMENT FEATURE FOR OVERCOMING A CANTILEVERED FORCE OF A BEND IN A WIRE BUNDLE

(71) Applicant: Sumitomo Wiring Systems, Ltd., Yokkaichi (JP)

(72) Inventor: Nathan Like, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 581 days.

(21) Appl. No.: 17/147,787

(22) Filed: Jan. 13, 2021

(65) Prior Publication Data

US 2022/0224095 A1 Jul. 14, 2022

(51) Int. Cl.
*H02G 3/16* (2006.01)
*H01R 9/24* (2006.01)
*H02G 3/08* (2006.01)
*H02G 3/14* (2006.01)

(52) U.S. Cl.
CPC .............. *H02G 3/16* (2013.01); *H01R 9/24* (2013.01); *H02G 3/081* (2013.01); *H02G 3/14* (2013.01)

(58) Field of Classification Search
CPC ........ H01R 13/6215; H01R 9/03; H01R 9/22; H01R 9/24; H02G 3/081; H02G 3/086; H02G 3/14; H02G 3/16
See application file for complete search history.

(56) References Cited

U.S. PATENT DOCUMENTS

| | | | | |
|---|---|---|---|---|
| 2,573,600 A * | 10/1951 | Pruehs | H02G 3/0633 | 16/2.5 |
| 2,667,368 A * | 1/1954 | Ferguson | H02G 3/0633 | 24/135 R |
| 2,895,003 A * | 7/1959 | Rapata | H02G 3/0633 | 16/2.5 |
| 3,141,062 A * | 7/1964 | Rapata | F16L 5/00 | 174/153 G |
| 3,672,103 A * | 6/1972 | Kost | H02G 9/10 | 174/37 |
| 3,751,579 A * | 8/1973 | Nojiri | F16L 5/00 | 174/650 |
| 3,809,798 A * | 5/1974 | Simon | H02G 3/0633 | 174/59 |
| 3,858,160 A * | 12/1974 | Denton | H01B 17/58 | 439/459 |
| 3,879,571 A * | 4/1975 | Reed | H02G 3/0633 | 439/456 |
| 3,958,300 A * | 5/1976 | Tanaka | F16L 5/00 | 439/459 |
| 3,986,228 A * | 10/1976 | Dowse | H02G 3/0633 | 410/105 |

(Continued)

*Primary Examiner* — William H. Mayo, III
*Assistant Examiner* — Rhadames Alonzo Miller
(74) *Attorney, Agent, or Firm* — Honigman LLP

(57) ABSTRACT

A power distribution box assembly includes a lower cover and a connector assembly. The connector assembly includes a connector housing and a dress cover. A wire bundle is routed from the connector housing through an opening of the lower cover. A retention feature is provided to prevent a cantilevered force generated by a bend in the wire bundle from dislodging the connector assembly out of position with respect to the lower cover.

9 Claims, 7 Drawing Sheets

(56) References Cited

U.S. PATENT DOCUMENTS

| | | | | |
|---|---|---|---|---|
| 4,125,238 | A * | 11/1978 | Tanaka | H02G 3/0633 16/2.5 |
| 4,162,561 | A * | 7/1979 | Tillemans | H01B 17/58 24/134 P |
| 4,167,301 | A * | 9/1979 | Mundschenk | H02G 3/0633 439/457 |
| 4,178,057 | A * | 12/1979 | McCormick | H02G 3/065 439/459 |
| 4,265,420 | A * | 5/1981 | McCormick | H01B 17/58 174/153 G |
| 4,487,386 | A * | 12/1984 | Hehl | H02G 3/0633 174/153 G |
| 4,493,467 | A * | 1/1985 | Borja | H02G 3/0633 174/153 G |
| 4,850,014 | A * | 7/1989 | Gillis | H04Q 1/028 D14/240 |
| 4,857,674 | A * | 8/1989 | Filbert | H02G 3/0633 403/252 |
| 4,886,938 | A * | 12/1989 | Rottmar | H02G 3/0633 174/559 |
| 5,205,758 | A * | 4/1993 | Comerci | H02G 3/125 439/535 |
| 5,304,742 | A * | 4/1994 | Filbert | H02G 3/0633 24/458 |
| 5,419,165 | A * | 5/1995 | Perkins | E05B 67/383 292/288 |
| 5,563,378 | A * | 10/1996 | Uchida | H02K 5/225 174/151 |
| 5,731,544 | A * | 3/1998 | Burck | H02G 3/14 220/241 |
| 5,796,040 | A * | 8/1998 | Feketitsch | H02G 3/0633 174/650 |
| 6,361,336 | B1 * | 3/2002 | Zhao | H01R 13/62938 439/157 |
| 7,786,391 | B1 * | 8/2010 | Van Pelt | H02G 3/18 277/606 |
| 9,153,950 | B2 * | 10/2015 | Yamanaka | E04D 13/00 |
| 9,419,420 | B1 * | 8/2016 | Parrish | H02G 3/0462 |
| 9,447,907 | B1 * | 9/2016 | Woodcock | H02G 9/04 |
| 9,742,169 | B1 * | 8/2017 | Matsumura | H02G 3/081 |
| 10,483,735 | B1 * | 11/2019 | Gretz | H02G 3/0481 |
| 10,765,950 | B1 * | 9/2020 | Clementi | H01R 13/6658 |
| 10,847,958 | B1 * | 11/2020 | Reed | H02G 3/0633 |
| 2002/0157848 | A1 * | 10/2002 | Chiriku | B60R 16/0238 174/50 |
| 2002/0157852 | A1 * | 10/2002 | Chiriku | H02G 3/18 174/60 |
| 2002/0168882 | A1 * | 11/2002 | Chiriku | H01R 9/2466 439/76.2 |
| 2007/0218721 | A1 * | 9/2007 | Naritomi | H05K 3/284 439/131 |
| 2009/0243524 | A1 * | 10/2009 | Katayama | H02M 7/003 318/400.07 |
| 2010/0218797 | A1 * | 9/2010 | Coyle, Jr. | H02S 40/345 174/548 |
| 2010/0230127 | A1 * | 9/2010 | Rodenberg | H02G 3/126 174/50 |
| 2010/0270071 | A1 * | 10/2010 | Plankell | H02G 3/126 174/502 |
| 2010/0279529 | A1 * | 11/2010 | Ng Vern Shen | H01R 13/5812 439/153 |
| 2011/0147171 | A1 * | 6/2011 | Bhathija | H01H 71/025 361/643 |
| 2014/0069904 | A1 * | 3/2014 | Sammons | H02G 15/113 219/136 |
| 2015/0138785 | A1 * | 5/2015 | Oksengendler | H05K 5/0247 362/374 |
| 2016/0272073 | A1 * | 9/2016 | Hosaka | H02M 7/44 |
| 2016/0315455 | A1 * | 10/2016 | Kiyota | B60R 16/0238 |
| 2018/0006414 | A1 * | 1/2018 | Ooishi | H02G 3/03 |
| 2018/0048132 | A1 * | 2/2018 | Dinh | H02G 3/18 |
| 2018/0054050 | A1 * | 2/2018 | Thomas | H02G 3/088 |
| 2018/0059348 | A1 * | 3/2018 | Burkett | G02B 6/445 |
| 2018/0310394 | A1 * | 10/2018 | Kobayashi | H05K 1/0263 |
| 2020/0211926 | A1 * | 7/2020 | Tahara | H05K 7/14322 |
| 2020/0389003 | A1 * | 12/2020 | Kobayashi | H02G 3/22 |
| 2021/0408774 | A1 * | 12/2021 | Hellige | H02G 3/22 |

* cited by examiner

POWER DISTRIBUTION BOX WITH AN ENGAGEMENT FEATURE FOR OVERCOMING A CANTILEVERED FORCE OF A BEND IN A WIRE BUNDLE

TECHNICAL FIELD

The disclosure relates to a power distribution box. In particular, the disclosure relates to a power distribution box having an engagement feature for overcoming a cantilevered force of a wire bundle.

BACKGROUND

Power distribution boxes 200 include an upper housing, a lower housing and a lower cover 202. For illustrative purposes, the upper housing and the lower housing are not shown. The lower cover 202 includes a connector assembly pocket 204 which is configured to hold a connector assembly 206. The connector assembly 206 includes a connector housing 208 and a dress cover 210. The connector housing 208 includes a plurality of terminal slits 210 for receiving wire terminals (not shown).

As shown in FIG. 1, wire terminals are seated underneath a bottom surface of the connector housing 208 and include a plurality of wires which are bundled together so as to form a wire bundle 212. The wire bundles 212 are then bent and directed along a wire routing path through an opening 214 of the lower cover 202. The wire bundle 212 may then be subsequently routed to the underside of the lower cover 202 so as to form a bend at the opening 214 of the lower cover 202. The bend is not shown in this illustration. This bend creates a cantilevered force which urges the connector assembly 206 upwardly and out of the connector assembly pocket 204. Thus, the assembly worker must physically press the connector assembly 206 back into the connector assembly pocket 204 so as to properly position the lower cover 202 for further assembly processes, such as the attachment of the upper housing and the lower housing.

Accordingly, it remains desirable to have a connector assembly pocket which is configured to overcome the cantilevered force generated by a bend in the wire, so as to retain the power distribution box in a position acceptable for further assembly processes.

SUMMARY

In one aspect a power distribution box is provided. The power distribution box is configured to accommodate a connector assembly. The connector assembly includes a connector housing, a dress cover, a wire bundle and a lower cover. The wire bundle is routed through the dress cover and an opening of the lower cover.

The lower cover further includes a connector assembly pocket. The connector assembly pocket is configured to hold the connector assembly. The connector assembly pocket includes an engagement feature. The engagement feature is spaced apart from and opposite of the opening. The engagement feature is configured to engage the dress cover so as to retain the connector assembly within the connector assembly pocket.

In one aspect, the engagement feature is a finger.

In one aspect, the lower cover includes an outer wall that bounds a floor. The connector assembly pocket is disposed on the floor and bound by the outer wall.

In another aspect, the connector assembly pocket includes a pair of inner sidewalls, a front wall, and a back wall. The engagement feature is mounted to a top edge of the back wall. In such an aspect, the engagement feature may be a finger.

In another aspect, the finger includes a planar member and a rib. The rib is disposed on a top edge of the planar member.

In another aspect, the rib includes catch portion and a ramp portion. The catch portion has a planar surface that is orthogonal to the planar member.

Also disclosed herein is a power distribution box assembly. The power distribution box assembly is configured to accommodate a wire bundle. In particular, the wire bundle extends along a wire routing path which includes a bend. The power distribution box assembly includes a connector assembly. The connector assembly includes a connector housing and a dress cover. The dress cover is coupled to a bottom surface of the connector housing. The dress cover includes a support wall. The power distribution box assembly further includes a lower cover. The lower cover includes an opening for receiving the wire bundle. The lower cover further includes a connector assembly pocket. The connector assembly pocket is configured to hold the connector assembly.

The connector assembly pocket includes an engagement feature. The engagement feature is spaced apart from and opposite of the opening. The engagement feature is configured to engage the support wall of the dress cover so as to retain the connector assembly in the connector assembly pocket which overcomes a load generated from the bend in the wire bundle.

In one aspect, an upper edge of the support wall is spaced apart from the bottom surface of the dress cover so as to define a slit, the engagement feature configured to engage the slit.

In one aspect, the engagement feature is a finger.

In one aspect, the power distribution box assembly includes an attachment member. The attachment member is disposed on the dress cover and is configured to engage the connector housing.

In another aspect, the connector housing includes a plurality of terminal slots wherein the wire bundle has a plurality of terminals that are configured to be seated within the terminal slots. The wire bundle is routed from the bottom surface of the connector housing through the opening of the dress cover and the lower cover so as to define a bend.

In another aspect, the lower cover includes an outer wall. The outer wall bounds a floor. The connector assembly pocket is disposed on the floor and is bound by the outer wall.

In another aspect, the connector assembly pocket includes a pair of inner sidewalls, a front wall and a back wall wherein the finger is mounted to a top edge of back wall. The power distribution box assembly may further include a finger having a planar member and a rib wherein the rib is disposed on a top edge of the planar member.

In another aspect, the rib includes a catch portion and a ramp portion wherein the catch portion has a planar surface that is orthogonal to the planar member.

Accordingly, a power distribution box and a power distribution box assembly is provided having an engagement feature which is configured to engage the connector assembly so as to retain the connector assembly within the connector assembly pocket and overcome a cantilevered force generated by a bend in the wire bundle.

DETAILED DESCRIPTION OF PREFERRED EMBODIMENTS

Figure 1:
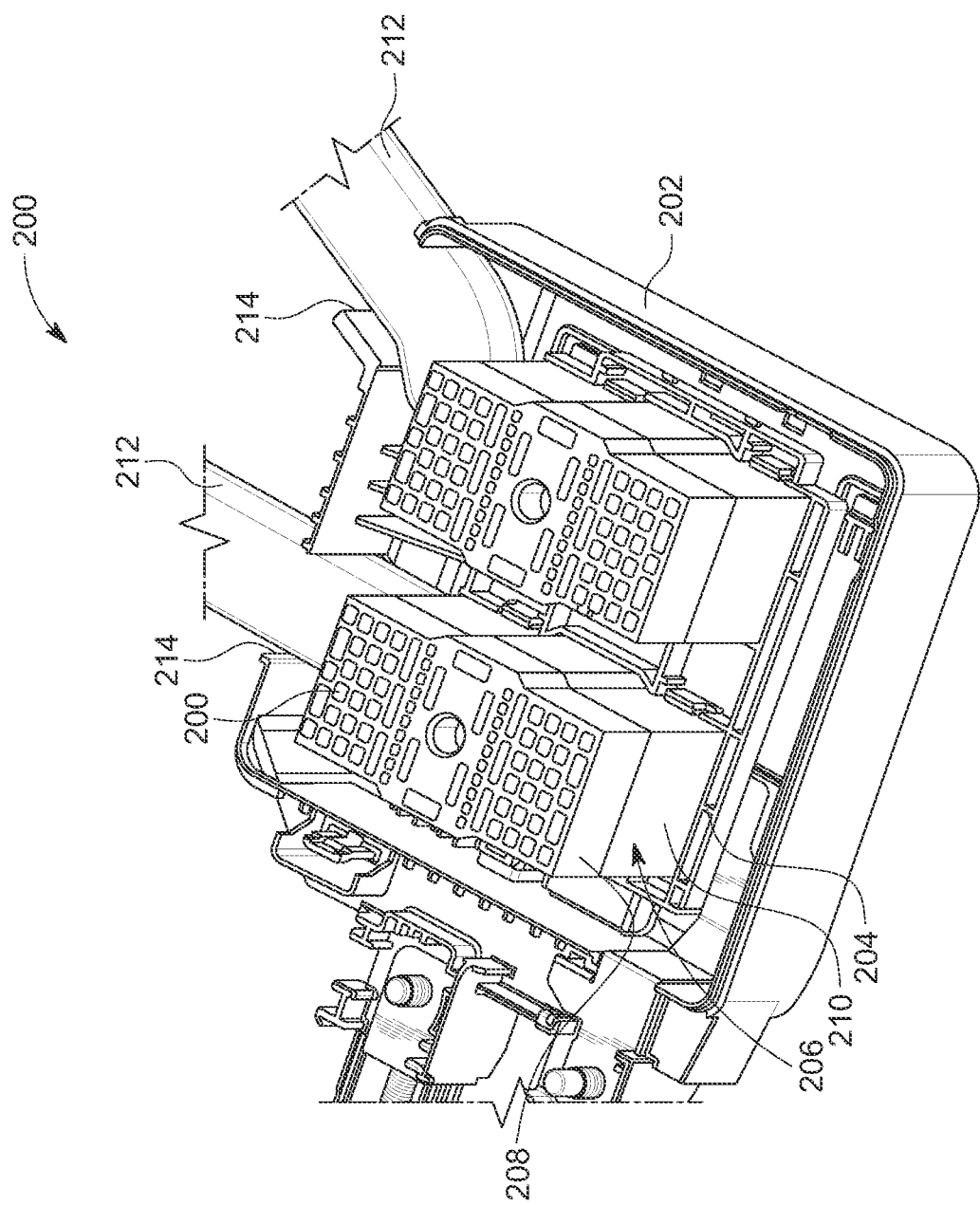
FIG. 1 is a perspective view of a power distribution box of the prior art.

A power distribution box assembly for accommodating a wire bundle is provided. The power distribution box assembly includes a connector assembly. The connector assembly includes a connector housing and a dress cover. The dress cover is coupled to the connector housing.

The power distribution box assembly includes a lower cover. The lower cover includes an opening for receiving the wire bundle and a connector assembly pocket. The connector assembly pocket is configured to accommodate the connector assembly. The connector assembly pocket includes an engagement feature configured to engage the dress cover so as to retain the connector assembly in a fixed position with respect to the connector assembly pocket and overcome a load generated from a bend in the wire bundle. As such, the connector assembly is retained in a proper position suitable for additional assembly processes.

With reference first to FIGS. 2 through 6, an illustrative depiction of a power distribution box 10 according to the principles of the present disclosure is provided. The power distribution box 10 may be formed of any material suitable for an injection molding process illustratively including polypropylene, Acrylonitrile butadiene styrene, polyoxymethylene, polycarbonate and the like.

The power distribution box 10 is configured to accommodate a connector assembly 12. The connector assembly 12 is preferably formed of a material suitable for an injection molding process, such as the materials listed above. The connector assembly 12 includes a connector housing 14 and a dress cover 16.

The connector housing 14 includes a plurality of terminal slots 18 for receiving terminals (not shown) to provide an electrical connection between various components such as fuses, relays and the like. The connector housing 14 is coupled to the dress cover 16 in a conventional manner. For illustrative purposes, the dress cover 16 is shown as having a plurality of resilient tabs 20 for engaging catches 22 disposed on a first sidewall 24 of the connector housing 14. The connector housing 14 is a generally cuboidal member having a pair of first side walls 24, a first front wall 26 and a first back wall 28.

The dress cover 16 is disposed at a bottom surface 30 of the connector housing 14. The dress cover 16 is configured to route the wires from the connector assembly 12 to an opening 32 of a lower cover 34. The dress cover 16 is a generally cylindrical member having a support wall 36, a pair of second side walls 38 so as to define an open end 40 and an open top 42, the open end 40 defining a wire route opening. The support wall 36 is opposite the open end 40 so as to define a closed end. The dress covers 16 has a generally u-shaped cross section. In one aspect of the connector assembly, 12 the support wall 36 includes a top edge 36a which is spaced apart from a bottom surface 14a of the connector housing 14 so as to define a slit 44.

Figure 2:
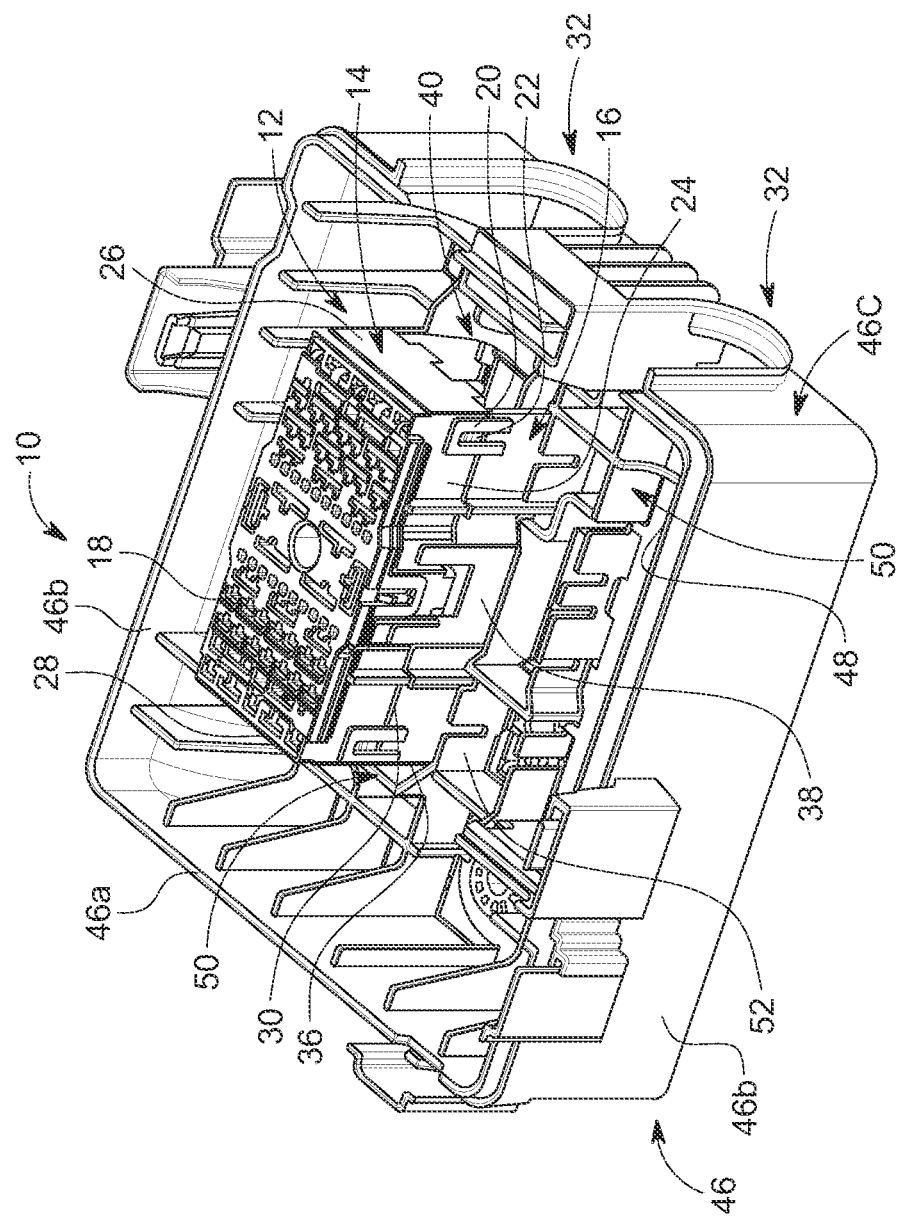
FIG. 2 is a perspective view of a power distribution box according to a first embodiment illustrated herein.

FIG. 2 depicts the connector assembly 12 fully seated within the lower cover 34. In particular, the lower cover 34 is a generally cuboidal dimension having an outer wall 46 which bounds a floor 48. The outer wall 46 includes a lower back wall 46a, a pair of lower sidewalls 46b, lower front wall 46c and a floor 48 so as to be open at the top of the lower cover 34. The lower front wall 46c of the lower cover 34 is illustratively shown as having a pair of lower openings 32. Each of the pair of lower openings 32 is configured to receive a wire bundle 300 (illustratively depicted in dashed lines in FIG. 7).

For illustrative purposes, the lower cover 34 is shown as having only one connector assembly 12 seated within one of a pair of connector assembly pockets 50. Each of the connector assembly pockets 50 are illustratively shown as being generally dimensioned the same as the other and therefore each configured to receive a connector assembly 12 of the same shape and dimension as each other. However, it should be appreciated that the connector assembly pockets 50 may be shaped differently so as to receive connector assemblies 12 of different dimensions.

The connector assembly pocket 50 is generally centered between the lower front wall 46c and the lower back wall 46a of the lower cover 34. In particular, the connector assembly pocket 50 includes a pair of inner sidewalls 52, an inner front wall 54 and an inner back wall 56 that are generally contiguous with each other and are dimensioned to bound a space configured to house the dress cover 16, as shown in FIG. 4.

The connector assembly pocket 50 includes an engagement feature 58. The engagement feature 58 is spaced apart from and opposite of the lower opening 32 of the lower cover 34. The engagement feature 58 is configured to engage the dress cover 16 retain the connector assembly 12 within the connector assembly pocket 50. In particular, the engagement feature 58 is configured to retain the dress cover 16 pressed against the floor 48 of the lower cover 34.

Figure 4:
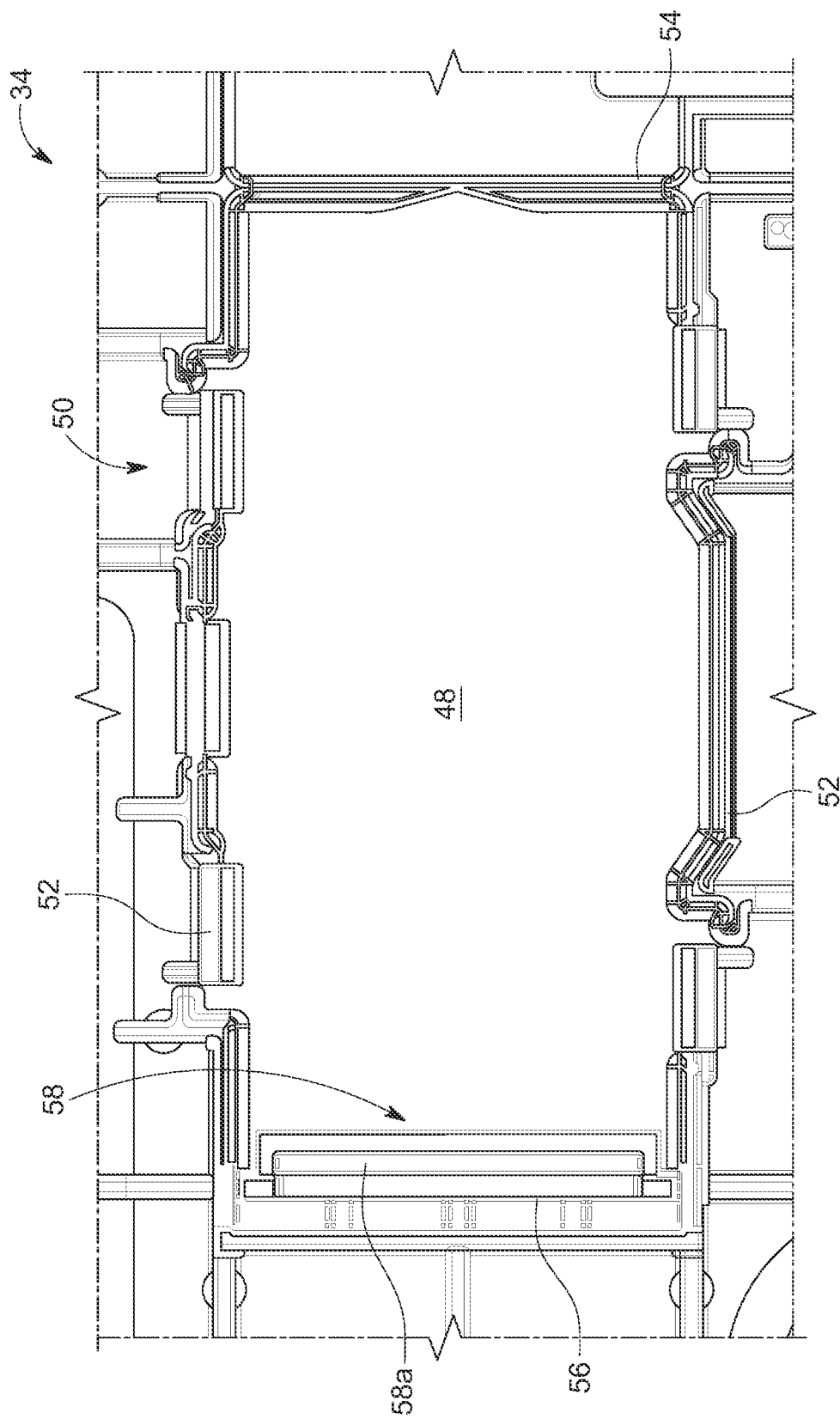
FIG. 4 is a perspective view of the connector assembly pocket.

With reference now to FIG. 4 a top down view of the connector assembly pocket 50 is provided. FIG. 4 illustrates how the inner sidewalls 52 may be formed to provide resiliency to engage the sides of the dress cover 16. In particular, each of the inner sidewalls 52 may include a plurality of inner slits 52a which define inner wall portions which are generally planar members. FIG. 4 illustrates how the inner sidewalls 52 may be dimensioned irregular and not necessarily symmetric with respect to each other so as to better accommodate the dimensions of the dress cover 16.

Figure 3:
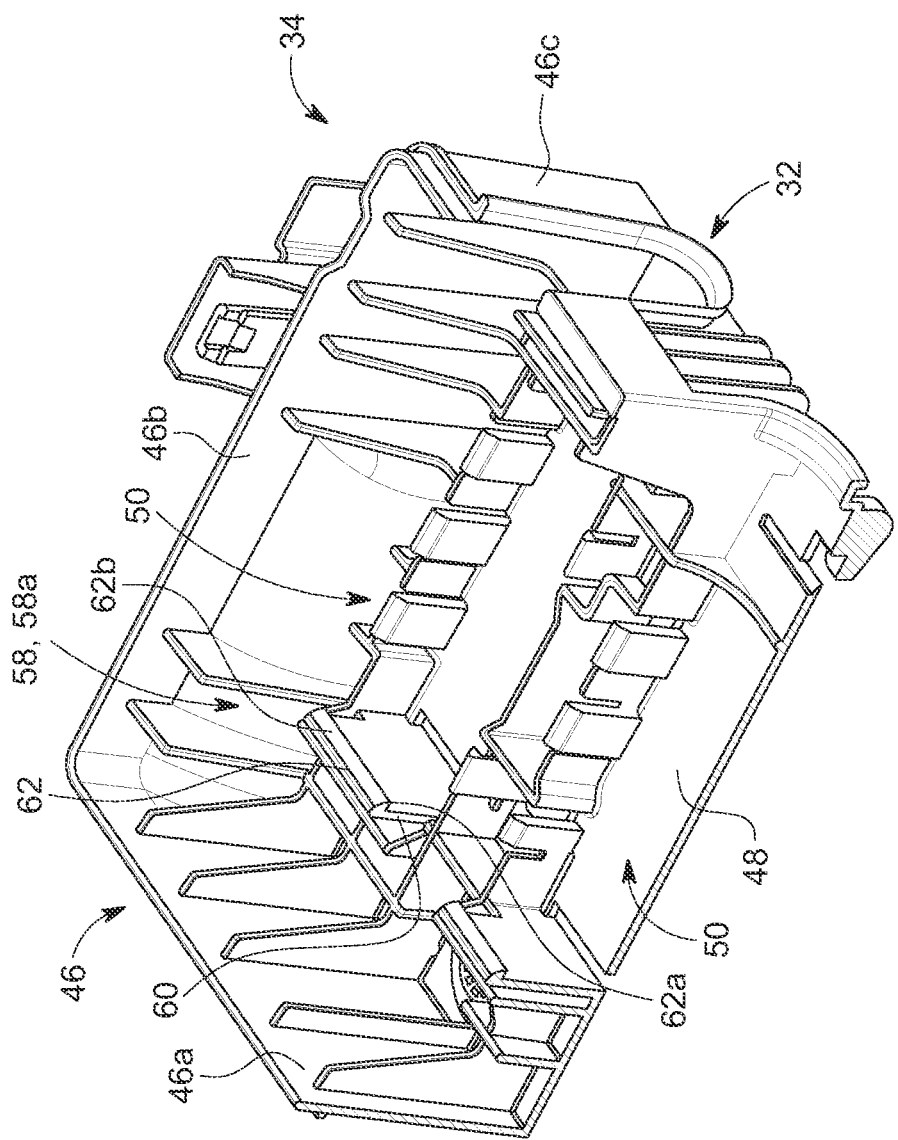
FIG. 3 is a cross sectional view of the power distribution box shown in FIG. 1 in a pre-installation state.
Figure 5:
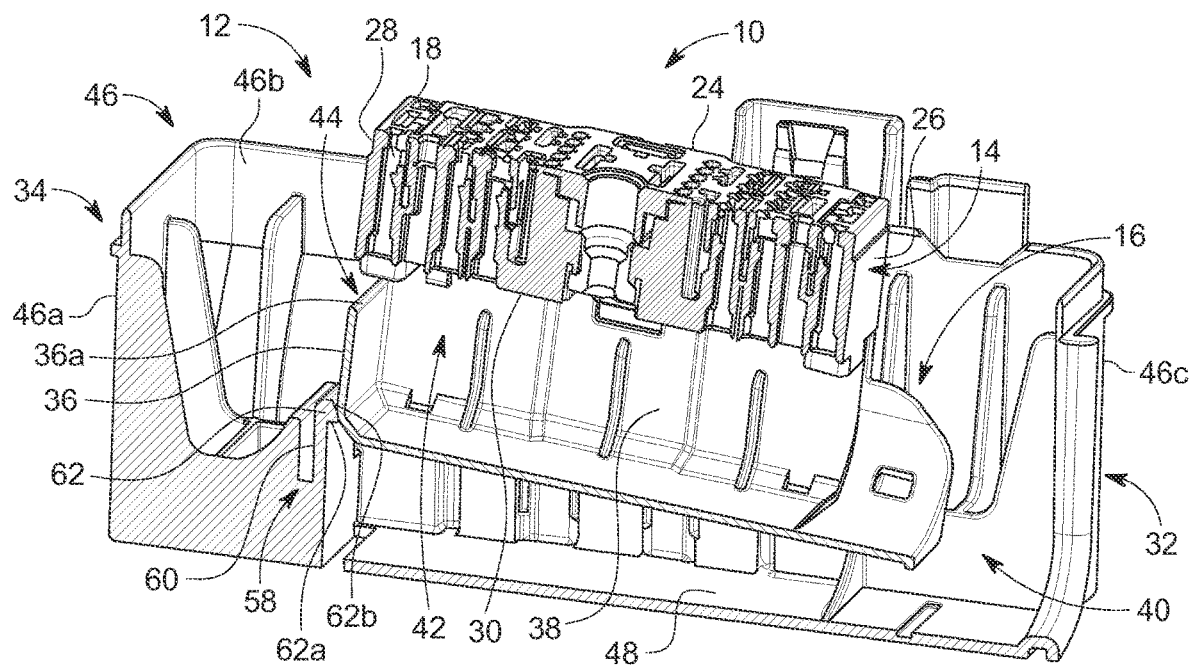
FIG. 5 is a cross sectional view showing the connector assembly engaged with a finger of the connector assembly pocket.

With reference now to FIG. 3 and also to FIG. 5, an illustrative depiction of the engagement feature 58 is provided. The engagement feature 58 is disposed on the inner back wall 56 of the connector assembly pocket 50. The engagement feature 58 is illustratively shown as a finger 58a having a planar member 60 and a rib 62. The rib 62 extends along a top edge of the planar member 60 and may be the width of the top edge of the planar member 60. The rib 62 is a generally ramped shaped member having a catch portion 62a and a ramp portion 62b. The catch portion 62a is a generally planar surface that is orthogonal to the planar member 60 and forms an undersurface of the catch portion 62a.

Figure 6:
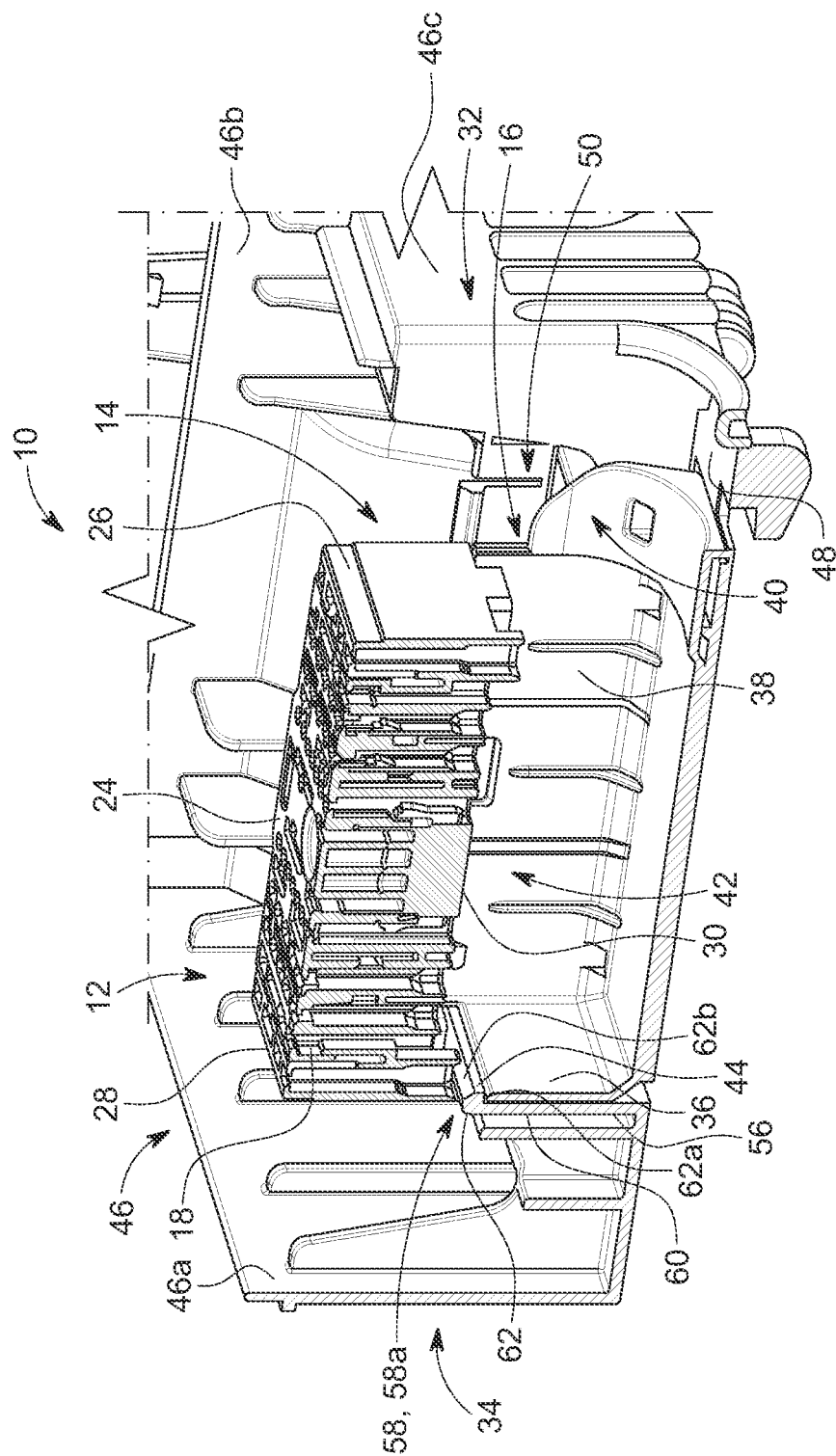
FIG. 6 is a top down view showing the connector assembly pocket.

With reference now to FIGS. 5 and 6, a depiction of the operation of the power distribution box 10 is provided wherein the connector assembly 12 is seated and is coupled together. The wire bundles 300 form a first bend defined by a routing path extending from an undersurface of the connector housing 14 through the open end 40 of the dress cover 16 and out the lower opening 32 of the lower cover 34. As the dress cover 16 is pressed into the connector assembly pocket 50, the engagement feature 58 is biased outwardly and the dress cover 16 is pressed down until a bottom surface 16a of the dress cover 16 is seated against a top surface of the floor 48 of the connector assembly pocket 50. The engagement feature 58 is shown as a resilient finger 58a which is returned to a neutral position and the catch portion 62a is seated against the top edge of the back wall of the dress cover 16 and the ramp portion is disclosed within the slit 44 as shown in FIG. 6.

As such, in the event that the wire bundle 300 is routed to the undersurface of the lower cover 34, the cantilevered force generated by a second bend in the wire formed about the opening 32 of the lower cover 34 is resisted by the engagement of the dress cover 16 and the engagement feature 58 of the connector pocket assembly 50. Specifically, the top edge of the support wall 36 of the dress cover 16 is pressed against the catch portion 62a of the finger 58a so as to retain the dress cover 16 in a seated position against the floor 48 of the lower cover 34.

Figure 7:
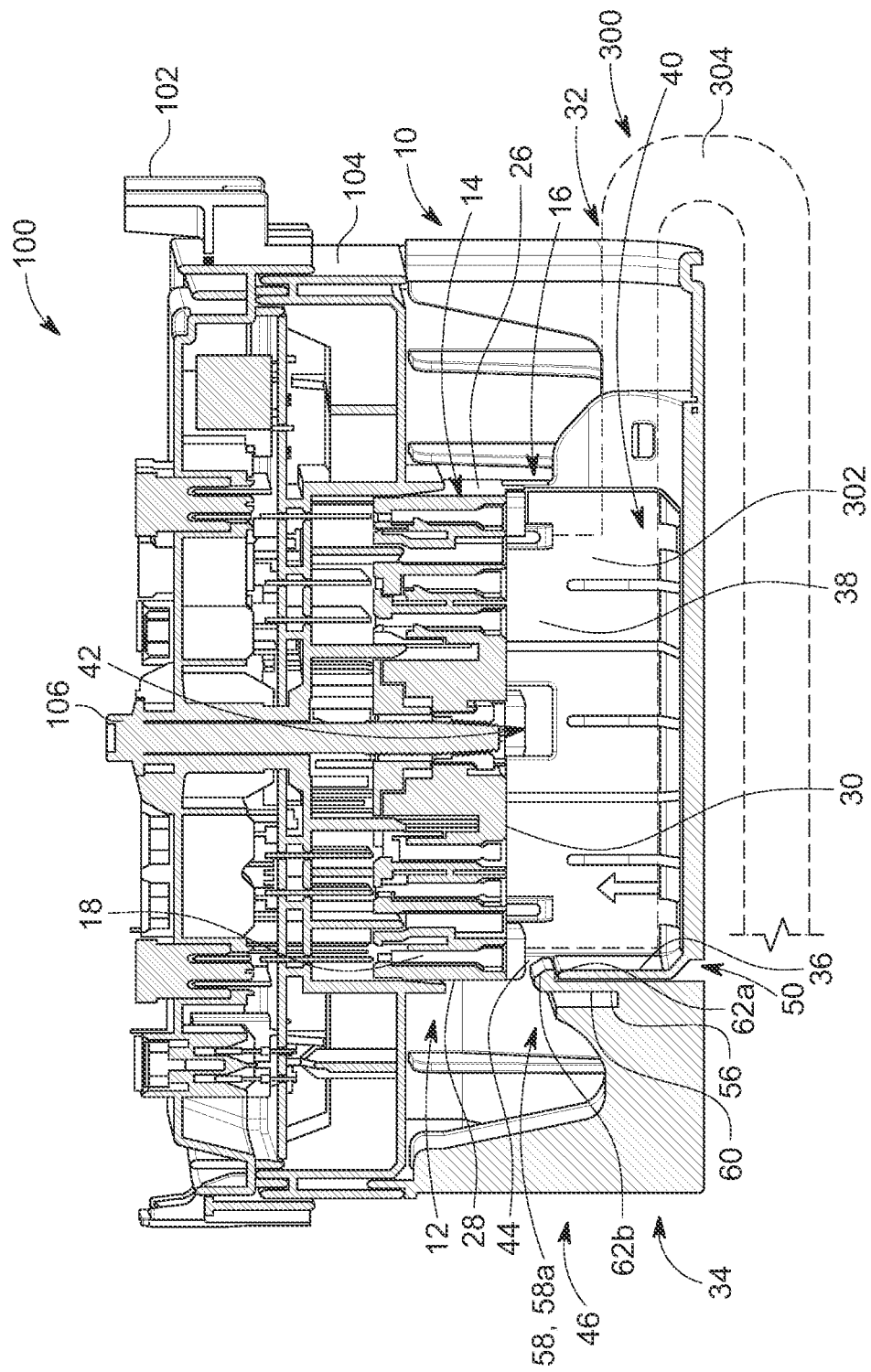
FIG. 7 is a cross sectional view of the power distribution box assembly showing the wire bundle.

With reference now to FIG. 7, a power distribution box assembly 100 is provided. The power distribution box assembly 100 is configured to accommodate a wire bundle 300. The power distribution box assembly 100 includes an upper housing 102, a lower housing 104 and a lower cover 34. The upper housing 102 and the lower housing may be formed of a material suitable for injection molding illustratively including polypropylene, polyoxymethylene, polycarbonate and the like. The upper housing 102 is configured to accommodate a plurality of electric components such as switches, fuses, relays and the like and the lower housing 104 is configured to hold a plurality of terminals. In particular, male terminals which are seated into the connector housing 14 of a connector assembly 12.

The connector assembly 12 is secured to the upper and lower housings 102, 104 using a bolt 106. The upper housing 102 is a generally rectangular member and may include conventional attachment features such as resilient tabs 20 and hooks which are configured to secure the upper housing 102 to the lower housing 104. Likewise, the lower housing 104 is a generally rectangular member configured to be covered by the upper housing 102.

The power distribution box assembly 100 includes a connector assembly 12. The connector assembly 12 includes a connector housing 14 and a dress cover 16. The connector housing 14 is a generally cuboidal member having a plurality of terminal slots 18 which extend between an upper and lower surface of the connector housing 14 so as to allow for an electrical connection between a pair of mating terminals.

The dress cover 16 is attached to a bottom surface of the connector housing 14. The dress cover 16 is configured to route the wires from the connector assembly 12 to an opening 32 of the lower cover 34. The dress cover 16 is a generally cylindrical member having a support wall 36, a pair of second side walls 38 so as to define an open end 40 and an open top 42, the open end 40 defining a wire route opening. The support wall 36 being opposite the open end 40 so as to define a closed end. The dress covers 16 has a generally u-shaped cross section. In one aspect of the connector assembly, 12 the support wall 36 includes a top edge 36a which is spaced apart from a bottom surface 14a of the connector housing 14 so as to define a slit 44.

The lower cover 34 includes a connector assembly pocket 50. The connector assembly pocket 50 is configured to hold the connector assembly 12. The connector assembly pocket 50 includes an engagement feature 58 which is configured to engage the support wall 36 of the dress cover 16 so as to retain the connector assembly 12 within the connector assembly pocket 50. In one aspect, the engagement feature 58 is a finger 58a. For instance, the finger 58a may be the same as the finger 58a described above. The finger 58a is spaced apart from and opposite of the lower opening 32 of the lower cover 34 and the finger 58a is configured to engage a structure of the support wall of the dress cover 16 so as to retain the connector assembly 12 within the connector assembly pocket 50. In one aspect, the finger is configured to engage the slit 44 between the connector housing 14 and the dress cover 16. In one aspect, the dress cover 16 includes an attachment member 62 configured to engage the connector housing 14. The attachment member 62 may be a conventional attachment member currently known or later developed. For illustrative purposes, the dress cover 16 is shown as having a plurality of resilient tabs 20 for engaging catches 22 disposed on a first sidewall 24 of the connector housing 14. The connector housing 14 is a generally cuboidal member having a pair of first side walls 24, a first front wall 26 and a first back wall 28.

With reference again to FIG. 7, the cross sectional view of an assembled view of the power distribution box assembly 100 is provided. During assembly the connector housing 14 is assembled together with the wires inserted into the terminal slits 52a so as to form a wire bundle 300. The wire bundle 300 is provided in dashed lines to facilitate explanation of the benefits of the power distribution box assembly 100 as described herein. As is illustrated, the wire bundle 300 includes a first bend 202 which routes the wire bundle 300 from the bottom surface of the connector housing 14 through the lower opening 32 of the lower cover 34. The wire bundle 300 may include a second bend 304 the end of the lower opening 32 of the lower cover 34 and is routed to an undersurface of the lower cover 34 which generates a cantilevered force which urges the dress cover 16 away from the connector housing 14, as indicated by the arrow. In particular, the cantilevered force urges the dress cover 16 and the connector housing 14 upward and away from the floor 48 of the lower cover 34. As the engagement feature 58 engages the support wall 36, the engagement feature 58 prevents the connector assembly 12 from being dislodged out of position.

It should be appreciated that the connector assembly 12 should remain fixed within the connector assembly pocket 50 so as to facilitate the assembly of the remaining pieces of the power distribution box assembly 100. Namely, once the connector assembly 12 is positioned, the lower housing 104 is mounted onto the connector assembly 12 and the upper housing 102 is then mounted onto the lower housing 104. A bolt 106 is used to secure the connector assembly 12 the lower housing 104 and the upper housing 102 together.

In instances where the connector assembly 12 is not properly seated within the connector assembly pocket 50, there is a chance that the bolt hole extending through the upper housing 102, lower housing 104 and connector housing 14 are not aligned, thus requiring the assembly worker to manually reposition the parts.

Accordingly, the power distribution box assembly 100 prevents the routing of a wire bundle 300 from disengaging the connector housing 14 assembly so as to facilitate the assembly of the power distribution box 10 assembled.

While particular embodiments have been illustrated and described herein, it should be appreciated that various other changes and modifications may be made without departing from the spirit and scope of the claimed subject matter. Moreover, although various aspects of the claimed subject matter have been described herein, such aspects need not be realized in combination. It is therefore intended that the appended claims cover all such changes and modifications that are within the scope of the claimed subject matter.

I claim:

1. A power distribution box assembly for accommodating a wire bundle, the power distribution box comprising:
    a connector assembly, the connector assembly having a connector housing and a dress cover, the dress cover coupled to a bottom surface of the connector housing, the dress cover having a support wall opposite of a wire route opening;
    a lower cover having an opening for receiving the wire bundle and a connector assembly pocket, wherein the connector assembly pocket is configured to hold the connector assembly, the connector assembly pocket further including an engagement feature, the engagement feature spaced apart from and opposite the opening, the engagement feature configured to engage the support wall of the dress cover so as to retain the connector assembly within the connector assembly pocket so as to overcome a load generated from a bend in the wire bundle.

2. The power distribution box assembly as set forth in claim 1, wherein an upper edge of the support wall is spaced apart from the bottom surface of the dress cover so as to define a slit, the engagement feature configured to engage the slit.

3. The power distribution box assembly as set forth in claim 2, wherein the engagement feature is a finger.

4. The power distribution box assembly as set forth in claim 3, wherein the dress cover includes an attachment member configured to engage the connector housing.

5. The power distribution box assembly as set forth in claim 4, wherein the connector housing includes a plurality of terminal slots and wherein the wire bundle has a plurality of terminals configured to be seated within a respective one of the plurality of terminal slots, wherein the wire bundle is routed from the bottom surface of the connector housing through the opening of the dress cover so as to define the bend.

6. The power distribution box assembly as set forth in claim 5, wherein the lower cover includes an outer wall bounding a floor, the connector assembly pocket disposed on the floor and bound by the outer wall.

7. The power distribution box assembly as set forth in claim 6, wherein the connector assembly pocket includes a pair of inner side walls, a front wall and a back wall, the finger is mounted to a top edge of the back wall.

8. The power distribution box assembly as set forth in claim 7, wherein the finger includes a planar member and a rib, the rib disposed on a top edge of the planar member.

9. The power distribution box assembly as set forth in claim 8, wherein the rib includes a catch portion and a ramp portion, the catch portion having a planar surface that is orthogonal to the planar member.

\* \* \* \* \*